United States Patent

Ando et al.

Patent Number: 4,643,985
Date of Patent: Feb. 17, 1987

[54] DIELECTRIC PORCELAIN MATERIAL

[75] Inventors: Minato Ando; Masaaki Ito; Fumio Mizuno, all of Aichi, Japan

[73] Assignee: NGK Spark Plug Co., Ltd., Aichi, Japan

[21] Appl. No.: 756,948

[22] Filed: Jul. 19, 1985

[30] Foreign Application Priority Data

Jul. 20, 1984 [JP] Japan ................. 59-151589

[51] Int. Cl.$^4$ .......... C04B 35/10; C04B 35/46
[52] U.S. Cl. ................... 501/136; 501/127; 501/153
[58] Field of Search .......... 501/136, 153, 127

[56] References Cited

U.S. PATENT DOCUMENTS 4,426,356  1/1984  Nair .................... 419/21
4,591,574  5/1986  Ando et al. ............ 501/136

FOREIGN PATENT DOCUMENTS 7095872  6/1982  Japan .
60/32113  9/1985  Japan .

Primary Examiner—William R. Dixon, Jr.
Assistant Examiner—A. Knab
Attorney, Agent, or Firm—Finnegan, Henderson, Farabow, Garrett & Dunner

[57] ABSTRACT

Disclosed are dielectric porcelain materials having compositions falling in the quadrilateral area defined by connecting points A, B, C and D in the ternary diagram of components $Al_2O_3$, $CaTiO_3$ and $SrTiO_3$ in the drawing. The points A, B, C and D are represented in mol % as follows:

|   | $Al_2O_3$ | $CaTiO_3$ | $SiTiO_3$ |
|---|-----------|-----------|-----------|
| A | 0.99      | 0.01      | 0         |
| B | 0.96      | 0.035     | 0.005     |
| C | 0.91      | 0.04      | 0.05      |
| D | 0.91      | 0.01      | 0.08      |

The dielectric porcelain materials have thermal coefficients between −15 and +15 and a no-load Q not less than 4000.

9 Claims, 1 Drawing Figure

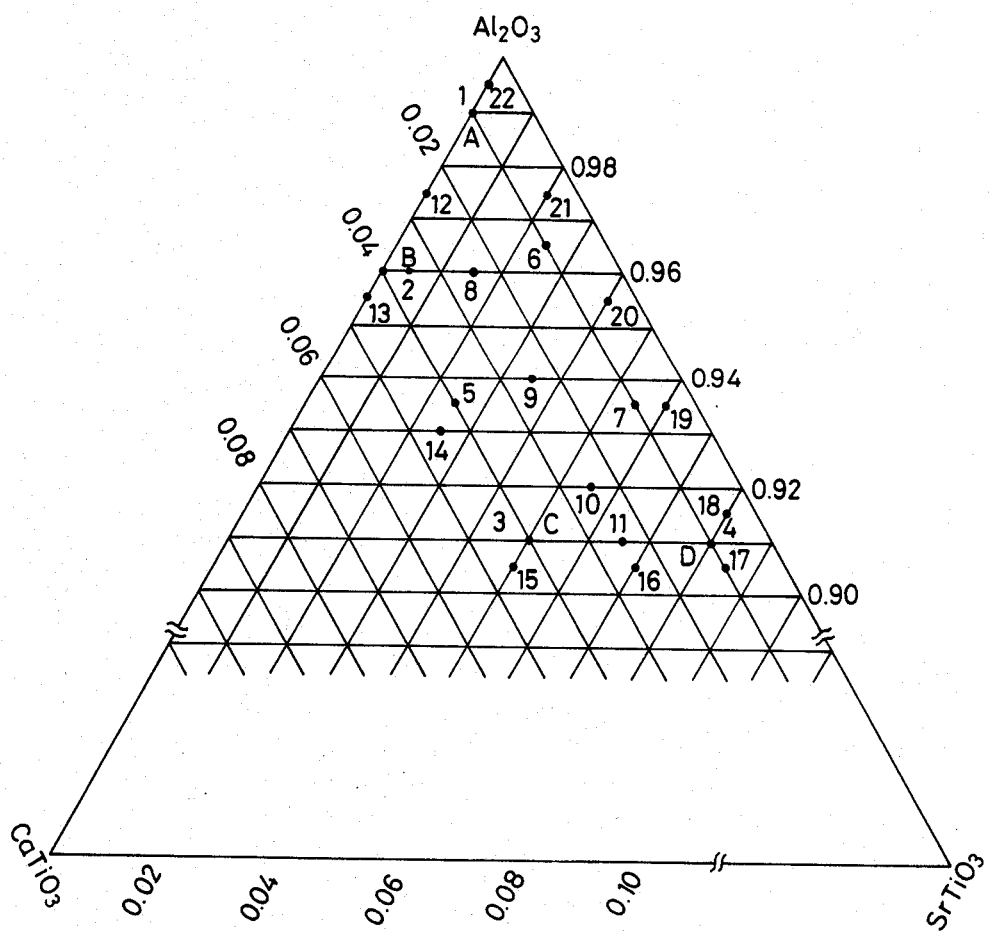

DIELECTRIC PORCELAIN MATERIAL

BACKGROUND OF THE INVENTION

The present invention relates to a dielectric porcelain material used in the micro-wave frequency region. More particularly, the invention relates to such a material used in frequencies higher than X-band, and which effectively demonstrates high no-load Q and stable thermal properties.

$ZrO_2$-$SnO_2$-$TiO_2$ and $BaO$-$TiO_2$ systems, and those systems partially substituted with other elements, or composite materials having a controlled thermal coefficient obtained by combining positive dielectric porcelains or glass with negative $TiO_2$, are heretofore well-known. However, their dielectric constants are as high as from 30 to 40. On the other hand, with the increasing use of high frequency regions and from the viewpoint of workability, materials with dielectric constants of about 10, rather than those with high constants as above described, have become of interest in the manufacture of porcelain substrates for dielectric resonators.

Alumina porcelains are known to have small dielectric constants. However, the thermal coefficients of aluminia porcelains which are as high as ±60 ppm/°C. have inhibited their practical applications.

In Japanese Patent Application No. 32113/84, materials are disclosed having compositions falling in the quadrilateral area defined in the $Al_2O_3$-$CaO$-$TiO_2$ ternary composition diagram in the application by connecting the following points:

|         | $Al_2O_3$ | $CaO$ | $TiO_2$ |
| ------- | --------- | ----- | ------- |
| point A | 0.94      | 0.04  | 0.02    |
| B       | .81       | .14   | .05     |
| C       | .81       | .02   | .17     |
| D       | .94       | .01   | .05     |

The materials are manufactured by combining alumina sinterings of thermal coefficients (hereinafter denoted $\tau f$) which have negative large-absolute values such as $-60$ ppm/°C., high no-load Q, small dielectric loss at high frequencies and excellent thermal conductivity, mechanical strength and chemical stability properties, with $CaO+TiO_2$-derived calcium-titanate materials of large positive $\tau f$ values. It has been desired, however, to further improve the $\tau f$ and no-load Q of the materials which are the invention of Japanese Patent Application No. 32113/84.

The principal object of the present invention is, therefore, to provide a dielectric porcelain material for use in the micro-wave frequency region that has improved $\tau f$ and no-load Q, and in particular, $\tau f$ and no-load Q which are improved over those of the materials of Japanese Patent Application No. 32113/84.

SUMMARY OF THE INVENTION

In order to achieve this and other objects of the invention, the $CaO$ and $TiO_2$ components mixed in the alumina porcelain of the material of Japanese Patent Application No. 32113/84 have been substituted by $CaTiO_3$ and $SrTiO_3$, respectively. The composition range of the $Al_2O_3$-$CaTiO_3$-$SrTiO_3$ material of the present invention is restricted to the quadrilateral area defined by the points A, B, C and D in the ternary composition diagram shown in the accompanying drawing.

The sintered porcelain of the present invention contains such minerals as $Al_2O_3$, $CaTiO_3$, $SrTiO_3$, $6Al_2O_3 \cdot CaO$, $16Al_2O_3 \cdot SrO$, $6Al_2O_3 \cdot SrO$, etc. The $Al_2O_3$ contributes toward maintaining high no-load Q, whereas the $CaTiO_3$, $SrTiO_3$, and especially stable $CaTiO_3$, contribute toward the improvement of $\tau f$.

BRIEF DESCRIPTION OF THE DRAWINGS

The single FIGURE is a ternary component diagram in which the compositional ranges of $Al_2O_3$, $CaTiO_3$ and $SrTiO_3$ in the porcelain material according to the present invention are defined.

DESCRIPTION OF THE PREFERRED EMBODIMENTS

The preferred embodiments are set forth in the following illustrative examples.

EXAMPLE 1

Synthesis of calcium titanate ($CaTiO_3$)

278 G of calcium carbonate (commercially available $CaCO_3$; reagent grade), 222 g of titanium dioxide (commercially available $TiO_2$; reagent grade), and 800 ml of water were mixed with 2 kg of alumina balls (99.99% pure, 20 mm diameter) in a polyethylene container having a volume of 2 liters under the condition of 84 RPM for 15 hours. The mixture was dried and the product which passed a 60-mesh sieve was calcinated in a 99.99% pure alumina crucible for one hour at 1300° C. using an electric furnace to obtain $CaTiO_3$. The calcined $CaTiO_3$ was re-crushed, dried and sieved under the same conditions as described above to obtain $CaTiO_3$ powder of grains which passed the 60-mesh sieve.

EXAMPLE 2

Synthesis of strontium titanate ($SrTiO_3$)

324 G of strontium carbonate (commercially available $SrCO_3$; reagent grade), 176 g of titanium dioxide (the same as that used in Example 1) and 800 ml of water were mixed and treated under the same conditions used in the synthesis of $CaTiO_3$ in Example 1.

EXAMPLE 3

Mixing of the components

The $CaTiO_3$ and $SrTiO_3$ powders synthesized in Examples 1 and 2 were appropriately mixed with 1000 kg of commercially available 99.99% pure alumina (average particle size of 0.5μ) to obtain products (Samples 1-22) having compositions as shown in the following Table 1 and in the drawing. The products of Samples 1-12 are indicated at points 1-12 in the drawing. These compositions fall within the quadrilateral area (margins included) defined by points A, B, C and D in the ternary composition diagram shown in the drawing. The products of Samples 13-22 are indicated at points 13-22 in the drawing and these compositions fall outside the said defined quadrilateral area. The compositions represented by points 1, 2, 3, and 4 correspond to the compositions represented by points A, B, C and D, respectively.

Test pieces were prepared in the following manner: For each of Samples 1-22, 1500 ml of water and 5 g of PVA (polyvinyl alcohol) caking agent were added to the appropriate mixture of $Al_2O_3$, $CaTiO_3$ and, when used, $SrTiO_3$ and the mixture was then mixed with 3 kg of 20 mm diameter 99.99% pure alumina balls in a polyethylene container having a volume of 3 liters under the condition of 84 RPM for 24 hours. The slurried product was pelletized by spray-drying using a 110 mm diameter atomizer at 170° C. and 7200 RPM. The granulated powder was press-formed to obtain cylinders 18.6 mm in diameter and 10.2 mm in length using a metal-mould press with a capacity of 1500 kg/cm$^2$. Sinterings 15.5 mm in diameter and 8.5 mm in length were obtained after burning at a temperature of from 1400° to 1500° C. for one hour in an electric furnace. The properties of test pieces 15 mm in diameter and 7 mm in length, obtained after the sinterings were finished by 0.1-s and 0.5-s polishing of the ends and outer surfaces, are shown in the following Table 1.

Also shown in the Table, for reference purposes, are the dielectric constant $\epsilon$, the thermal coefficient $\tau f$ and the no-load Q for each of $Al_2O_3$, $CaTiO_3$ and $SrTiO_3$.

wherein the points A, B, C and D are represented in mol% as follows:

|   | $Al_2O_3$ | $CaTiO_3$ | $SrTiO_3$ |
|---|---|---|---|
| A | 0.99 | 0.01 | 0 |
| B | 0.96 | 0.035 | 0.005 |
| C | 0.91 | 0.04 | 0.05 |
| D | 0.91 | 0.01 | 0.08 |

2. The dielectric porcelain material of claim 1 containing minerals selected from $Al_2O_3$, $CaTiO_3$, $6Al_2O_3\cdot CaO$, $16Al_2O_3\cdot SrO$ and $6Al_2O_3\cdot SrO$.

3. The dielectric porcelain material of claim 1 having a thermal coefficient $\tau f$ between $-15$ and $+15$.

4. The dielectric porcelain material of claim 2 wherein the thermal coefficient $\tau f$ is measured in the temperature range of from 25° to 85° C. and calculated

TABLE 1

| Sample | Composition (Mole Ratio) $Al_2O_3$ | $CaTiO_3$ | $SrTiO_3$ | Dielectric Constant $\epsilon$ (at 8~9 GHz) | Thermal Coefficient of the Resonance Frequency $\tau f$ (ppmC) | No-load Q | Remarks |
|---|---|---|---|---|---|---|---|
| 1 | 0.99 | 0.01 | 0 | 10.5 | −15 | 5900 | Within |
| 2 | 0.96 | 0.035 | 0.005 | 12.2 | +13 | 4200 | the |
| 3 | 0.91 | 0.04 | 0.05 | 13.0 | +15 | 4000 | present |
| 4 | 0.91 | 0.01 | 0.08 | 12.8 | −8 | 4000 | invention |
| 5 | 0.935 | 0.04 | 0.025 | 12.6 | +14 | 4100 | |
| 6 | 0.965 | 0.01 | 0.025 | 10.9 | −14 | 4900 | |
| 7 | 0.935 | 0.01 | 0.055 | 11.4 | −13 | 4500 | |
| 8 | 0.96 | 0.025 | 0.015 | 11.6 | +0.7 | 4500 | |
| 9 | 0.94 | 0.025 | 0.035 | 12.0 | +1.3 | 4300 | |
| 10 | 0.92 | 0.025 | 0.055 | 12.4 | +2.4 | 4200 | |
| 11 | 0.91 | 0.025 | 0.065 | 12.5 | +3 | 4100 | |
| 12 | 0.975 | 0.025 | 0 | 11.4 | +0.1 | 5000 | |
| 13 | 0.955 | 0.045 | 0 | 12.6 | +20 | 3800 | Outside |
| 14 | 0.93 | 0.045 | 0.025 | 12.7 | +24 | 3600 | the |
| 15 | 0.905 | 0.045 | 0.05 | 13.2 | +27 | 3400 | present |
| 16 | 0.905 | 0.025 | 0.07 | 12.9 | +10 | 3500 | invention |
| 17 | 0.905 | 0.01 | 0.085 | 13.0 | −5 | 3600 | |
| 18 | 0.915 | 0.005 | 0.08 | 12.8 | −18 | 3800 | |
| 19 | 0.935 | 0.005 | 0.06 | 11.0 | −19 | 4300 | |
| 20 | 0.955 | 0.005 | 0.04 | 10.7 | −20 | 5200 | |
| 21 | 0.975 | 0.005 | 0.02 | 10.6 | −21 | 5700 | |
| 22 | 0.995 | 0.005 | 0 | 10.1 | −22 | 6000 | |
| $Al_2O_3$ | (99.5%) | | | 9.7 | −63 | 5500 | |
| $CaTiO_3$ | | | | 155 | +890 | 4000 | |
| $SrTiO_3$ | | | | 250 | +1640 | 1100 | |

For the values shown in Table 1, the measurements of the dielectric constant $\epsilon$ were obtained by the dielectric cylinder resonance method (resonance frequency: 8–9 GHz). The thermal coefficients $\tau f$ were measured in the temperature range of from 25° to 85° C. and calculated using the following equation:

$$\tau f = -\tfrac{1}{2}\tau\epsilon - \alpha$$

wherein $\tau\epsilon$ represents the temperature difference of the dielectric constant, and $\alpha$ represents the coefficient of linear thermal expansion of the porcelain material.

As seen in Table 1, the products according to the present invention have $\tau f$ values between $-15$ and $+15$ and a no-load Q not less than 4000, indicating that they can be effectively used in the micro-wave range, and especially in the frequencies equal to and higher than the X-band.

The present invention has been disclosed in terms of preferred embodiments. The invention, however, is not limited thereto. The scope of the invention is determined by the appended claims and their equivalents.

What is claimed is:

1. A dielectric porcelain material having a composition falling in the quadrilateral area defined by connecting points A, B, C and D in the ternary diagram of components $Al_2O_3$, $CaTiO_3$ and $SrTiO_3$ in the drawing using the equation:

$$\tau f = -\tfrac{1}{2}\tau\epsilon - \alpha$$

wherein $\tau\epsilon$ represents the temperature difference of the dielectric constant and $\alpha$ represents the coefficient of linear thermal expansion of the porcelain material.

5. The dielectric porcelain material of claim 1 having a no-load Q not less than 4000.

6. The dielectric porcelain material of claim 1 containing minerals selected from $Al_2O_3$, $CaTiO_3$, $6Al_2O_3\cdot CaO$, $16Al_2O_3\cdot SrO$ and $6Al_2O_3\cdot SrO$.

7. The dielectric porcelain material of claim 1 having a thermal coefficient $\tau f$ between $-15$ and $+15$.

8. The dielectric porcelain material of claim 6 wherein the thermal coefficient $\tau f$ is measured in the temperature range of from 25° to 85° C. and calculated using the equation:

$$\tau f = -\tfrac{1}{2}\tau\epsilon - \alpha$$

wherein $\tau\epsilon$ represents the temperature difference of the dielectric constant and $\alpha$ represents the linear expansion of the porcelain material.

9. The dielectric porcelain material of claim 1 having a no-load Q not less than 4000.

* * * * *

UNITED STATES PATENT AND TRADEMARK OFFICE
CERTIFICATE OF CORRECTION

PATENT NO. : 4,643,985

DATED : February 17, 1987

INVENTOR(S) : Minato Ando et al.

It is certified that error appears in the above-identified patent and that said Letters Patent is hereby corrected as shown below:

Claim 4, line 1, "claim 2" should be --claim 3--.

Claim 8, line 1, "claim 6" should be --claim 7--.

Signed and Sealed this

Twenty-fifth Day of August, 1987

Attest:

DONALD J. QUIGG

Attesting Officer

Commissioner of Patents and Trademarks